US010812152B1

(12) United States Patent
Qu et al.

(10) Patent No.: US 10,812,152 B1
(45) Date of Patent: *Oct. 20, 2020

(54) POSITIONAL TRACKING ASSISTED BEAM FORMING IN WIRELESS VIRTUAL REALITY SYSTEMS

(71) Applicant: Facebook Technologies, LLC, Menlo Park, CA (US)

(72) Inventors: Qi Qu, Redmond, WA (US); Ganesh Venkatraman, San Jose, CA (US); Hongyu Zhou, San Francisco, CA (US); Ryan Hamilton Brown, Austin, TX (US); Oskar Linde, San Carlos, CA (US); Lyle David Bainbridge, Redwood City, CA (US); Matthew James Devoe, Happy Valley (HK); Ali Yazdan, San Francisco, CA (US); Sam Padinjaremannil Alex, Dublin, CA (US); Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,044

(22) Filed: Apr. 13, 2020

Related U.S. Application Data

(60) Continuation of application No. 16/389,287, filed on Apr. 19, 2019, now Pat. No. 10,659,110, which is a
(Continued)

(51) Int. Cl.
*H04B 7/14* (2006.01)
*H04B 7/0408* (2017.01)
(Continued)

(52) U.S. Cl.
CPC ............. *H04B 7/0408* (2013.01); *G01S 17/89* (2013.01); *H04B 1/385* (2013.01); *H04B 7/0608* (2013.01);
(Continued)

(58) Field of Classification Search
CPC ..... H04W 76/28; H04W 76/27; H04W 16/10; H04W 52/0219; H04W 74/00; H04W 76/38; H04W 80/06; H04W 84/042
See application file for complete search history.

(56) References Cited

U.S. PATENT DOCUMENTS

| 2016/0248995 A1 | 8/2016 | Mullins et al. |
| 2017/0045941 A1 | 2/2017 | Tokubo et al. |
| 2018/0132116 A1 | 5/2018 | Shekhar et al. |

OTHER PUBLICATIONS

IEEE 802.11 ad Standard, "Part 11: Wireless LAN Medium Access Control (MAC) and Physical Layer (PHY) Specifications," IEEE Standards Association, IEEE, Dec. 28, 2012, 628 pages, http://exocomm.com/library/802.11/802.11ad-2012.pdf.
(Continued)

*Primary Examiner* — Tu X Nguyen
(74) *Attorney, Agent, or Firm* — Fenwick & West LLP

(57) ABSTRACT

Embodiments of the present disclosure support a head-mounted display (HMD) wirelessly coupled to a console. The HMD includes a positional tracking system, a beam controller and a transceiver. The positional tracking system tracks position of the HMD and generates positional information describing the tracked position of the HMD. The transceiver communicates with a console via a wireless channel, in accordance with communication instructions, the communication instructions causing the transceiver to communicate over one directional beam of a plurality of directional beams. The beam controller determines a change in the positional information. Based on the change to the positional information, the beam controller determines a
(Continued)

directional beam of the plurality of directional beams. The beam controller further generates the communication instructions identifying the determined directional beam, and provides the communication instructions to the transceiver.

20 Claims, 10 Drawing Sheets

Related U.S. Application Data continuation of application No. 16/122,779, filed on Sep. 5, 2018, now Pat. No. 10,326,500, which is a continuation of application No. 15/818,624, filed on Nov. 20, 2017, now Pat. No. 10,148,324, which is a division of application No. 15/433,817, filed on Feb. 15, 2017, now Pat. No. 9,866,286.

(51) Int. Cl.
*H04B 7/06* (2006.01)
*H04B 7/26* (2006.01)
*H04B 1/3827* (2015.01)
*G01S 17/89* (2020.01)
*G01S 5/16* (2006.01)

(52) U.S. Cl.
CPC ............ *H04B 7/0695* (2013.01); *H04B 7/26* (2013.01); *G01S 5/163* (2013.01); *H04B 2001/3866* (2013.01)

(56) References Cited

OTHER PUBLICATIONS

United States Office Action, U.S. Appl. No. 15/433,817, dated Jul. 17, 2017, 8 pages.

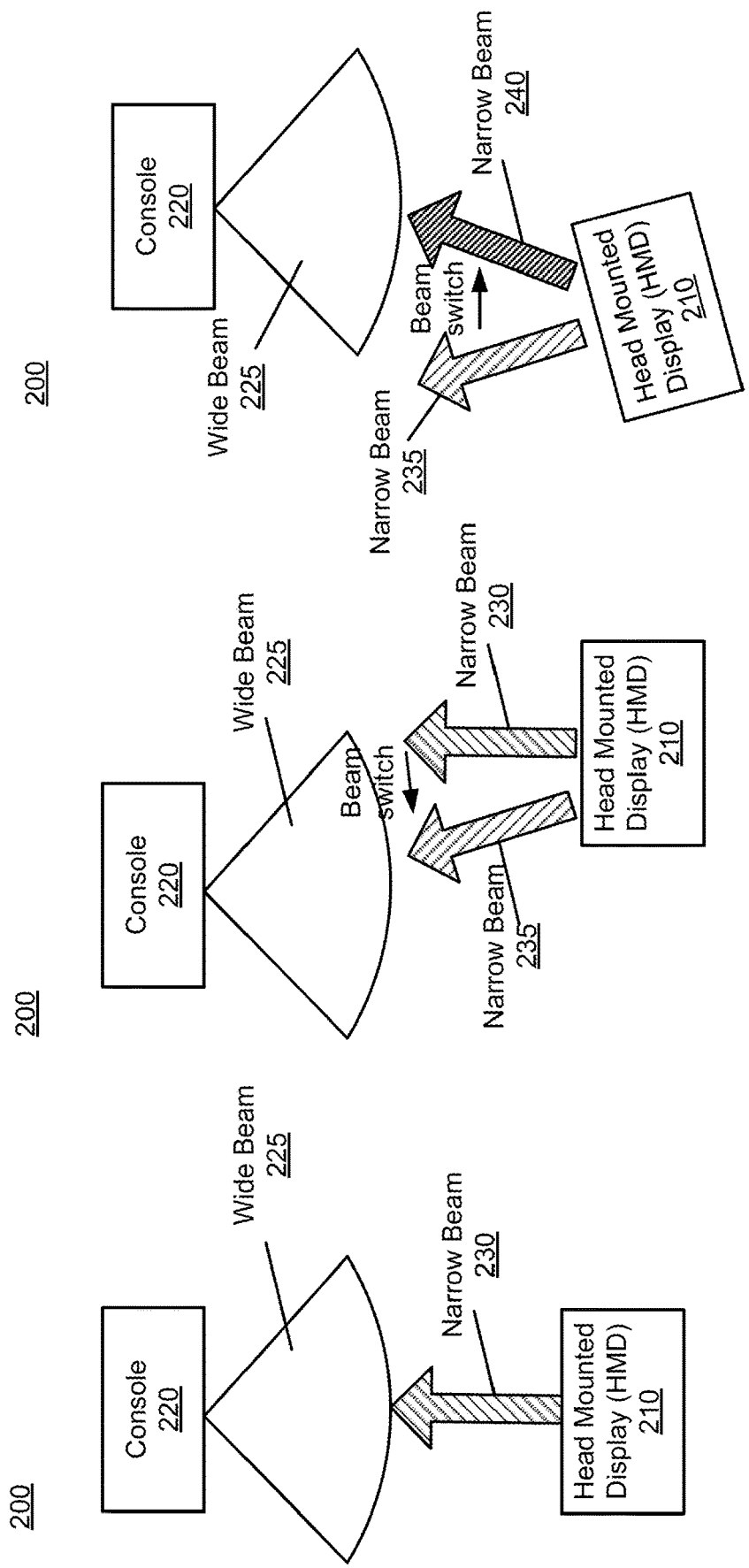

POSITIONAL TRACKING ASSISTED BEAM FORMING IN WIRELESS VIRTUAL REALITY SYSTEMS

CROSS REFERENCE TO RELATED APPLICATIONS

This application is a continuation of pending U.S. application Ser. No. 16/389,287, filed Apr. 19, 2019, which is a continuation of U.S. application Ser. No. 16/122,779, filed Sep. 5, 2018, now U.S. Pat. No. 10,326,500, which is a continuation of U.S. application Ser. No. 15/818,624, filed Nov. 20, 2017, now U.S. Pat. No. 10,148,324, which is a division of U.S. application Ser. No. 15/433,817, filed Feb. 15, 2017, now U.S. Pat. No. 9,866,286, which are incorporated by reference in their entirety.

BACKGROUND

The present disclosure generally relates to virtual and augmented reality systems, and specifically relates to positional tracking assisted beam forming in wireless virtual reality and augmented reality systems.

It is desirable to establish a reliable and fast wireless communication between a console and a head-mounted display (HMD) in a virtual reality (VR) system, an augmented reality (AR) system, a mixed reality (MR) system, or some combination thereof, to, e.g., "cut the cord" between the console and the HMD. A wireless communication based on extremely high carrier frequencies, such as communication based on 60 GHz carrier frequency in accordance with the IEEE 802.11ad standard or the IEEE 802.11ay standard represents a promising technology for achieving reliable wireless experience in VR, AR and MR systems. A base station (e.g., console) that wirelessly communicates with a client (e.g., HMD) based on 60 GHz carrier frequency employs beam forming to compensate for a path loss and maintain a quality of wireless link above a predetermined threshold value. The base station typically employs the beam forming based on beam training and beam tracking in order to ensure its effectiveness.

In the IEEE 802.11ad standard, the beam training and beam tracking is performed by employing a sector level sweep and a beam refinement protocol. However, the beam training and beam tracking causes a high overhead and large latency. The high overhead of the beam training and beam tracking is due to a feedback communicated between a pair of wireless devices (e.g., the console and the HMD), which consumes an additional communication bandwidth. The large latency of the beam training and beam tracking is due to a latency of the sector level sweep that can be approximately between 2 ms and 100 ms. Thus, the beam forming based on sector level sweep cannot handle typical movements of the HMD as the beam forming based on sector level sweep can support the HMD's movement speeds of only up to a certain speed that is slower than a speed of the typical HMD's movements. A latency of the beam refinement protocol is lower and approximately 200 µs-300 µs per iteration. However, the beam refinement protocol typically needs multiple iterations to determine a preferred directional beam for communication between a pair of wireless devices. If only considering the latency, the beam refinement protocol can support typical movement speeds of the HMD. However, the beam refinement protocol is often subject to many imperfections and may result in data losses. Furthermore, the accuracy of beam training and beam tracking is limited by the digital baseband estimate variation and antenna beam pattern. Because of that, a HMD may not be able to use an optimal beam direction for wireless communication with a console. This may also cause delay between beam switching processes. In addition, the beam training and beam tracking features non-awareness in relation to non-line-of-sight (NLOS) conditions between a pair of wireless devices. In the case NLOS condition is present between the pair of wireless devices, communication based on the beam training and beam tracking cannot provide prompt remedy, which causes loss of data when communicated between the wireless devices.

SUMMARY

Embodiments of the present disclosure support a head-mounted display (HMD) that wirelessly communicates with a console. The HMD and the console may be part of, e.g., a wireless virtual reality (VR) system, a wireless augmented reality (AR) system, a wireless mixed reality (MR) system, or some combination thereof. The HMD includes a positional tracking system, a transceiver, and a beam controller. The positional tracking system is configured to track a position of the HMD and generate positional information describing the tracked position of the HMD. The transceiver is configured to communicate with a console via a wireless channel, in accordance with communication instructions, the communication instructions causing the transceiver to communicate over one directional beam of a plurality of directional beams. In some embodiments, some or all of the directional beams used by the transceiver of the HMD for wireless communication with the console can be directional narrow beams. In alternate embodiments, some or all of the directional beams used by the transceiver of the HMD for wireless communication with the console can be directional wide beams. The beam controller is configured to determine a change in the positional information. Based in part on the change to the positional information, the beam controller determines a directional beam of the plurality of directional beams. The beam controller further generates the communication instructions identifying the determined directional beam, and provides the communication instructions to the transceiver.

The console that wirelessly communicates with the HMD includes a positional tracking system, a beam controller, and a transceiver. The positional tracking system of the console tracks a position of the HMD and generates positional information describing the tracked position of the HMD. The beam controller of the console determines a change in the positional information. Based in part on the change to the positional information, the beam controller determines a directional beam of a plurality of directional beams of the HMD. The beam controller of the console further generates communication instructions identifying the determined directional beam. The transceiver of the console communicates with the HMD via a wireless channel, and transmits the communication instructions to the HMD, the communication instructions causing the HMD to communicate with the apparatus over the determined directional beam.

BRIEF DESCRIPTION OF THE DRAWINGS

FIG. 2A is a wireless system that includes the HMD in FIG. 1A in a first position wirelessly communicating with a console, in accordance with an embodiment.

FIG. 2B is the wireless system shown in FIG. 2A where the HMD switches a beam for wireless communication with the console to a preferred direction when the HMD moves relative to the console from the first position to a second position, in accordance with an embodiment.

FIG. 2C is the wireless system shown in FIG. 2A where the HMD switches a beam for wireless communication with the console to a preferred direction when the HMD moves relative to the console from the second position to a third position, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments support a head-mounted display (HMD) that is wirelessly coupled to a console. The HMD and the console may be part of, e.g., a wireless virtual reality (VR) system, a wireless augmented reality (AR) system, a wireless mixed reality (MR) system, or some combination thereof. Embodiments disclosed herein support the HMD that communicates wirelessly with the console using a narrow beam that is oriented in a particular direction, which is herein referred to as a directional narrow beam. However, in alternate embodiments, the HMD can utilize a wide beam oriented in a particular direction to wirelessly communicate with the console, which is herein referred to as a directional wide beam. The console communicates wirelessly with the HMD using a directional wide beam or a directional narrow beam. A directional narrow beam focuses a transmission signal to a direction directly pointing to a receiving device, and may occupy a region of space having a beam diameter below a threshold value. A directional wide beam provides transmission of a signal in a direction that may not directly point to a receiving device, and may occupy a region of space having a beam diameter above the threshold value. In some systems, the HMD uses an "inside-out" positional tracking while wirelessly communicating with the console to determine location of the HMD relative to the console. When the HMD determines that its location changed relative to the console, the HMD can automatically redirect the narrow beam to another direction to ensure a quality of wireless link between the HMD and the console is above a threshold value. In some embodiments, where the line-of-sight (LOS) is lost between the console and the HMD, the HMD may automatically redirect a transmission beam to a reflection path. In alternate embodiments, a console wirelessly communicating with a HMD can apply an "outside-in" positional tracking to determine a position of the HMD relative to the console. In these cases, the console can instruct the HMD in what direction to adjust the narrow beam to ensure the link quality is above the threshold value, based on the determined position of the HMD.

Figure 1A:
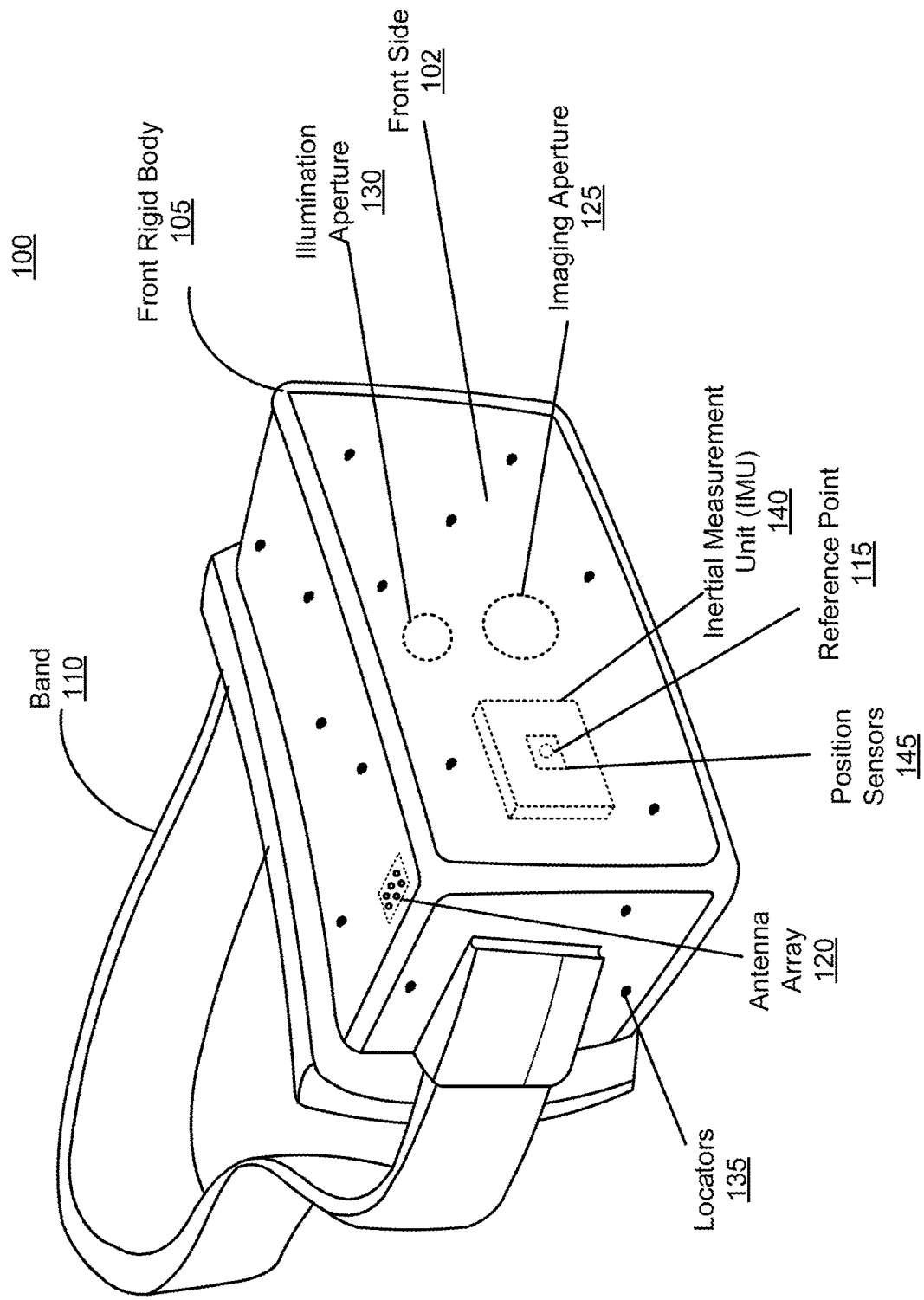
FIG. 1A is a diagram of a head-mounted display (HMD), in accordance with an embodiment.

FIG. 1A is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, a reference point 115, and an antenna array 120. In some embodiments, the antenna array 120 integrated into the front rigid body 105 comprises multiple phased-array antennas, which may be used for wireless communication with a console (not shown in FIG. 1A) based on beam forming. The HMD 100 performs wireless communication with the console in different beam directions using the phased-array antennas of the antenna array 120. The antenna array 120 can change a beam direction for wireless communication by applying specific beam forming coefficients.

In some embodiments, the HMD 100 shown in FIG. 1A also includes a depth camera assembly (DCA) configured to determine depth information of a local area surrounding some or all of the HMD 100. In these embodiments, the HMD 100 would also include an imaging aperture 125 and an illumination aperture 130, and an illumination source of the DCA would emit light (e.g., structured light) through the illumination aperture 130. An imaging device of the DCA would capture light from the illumination source that is reflected/scattered from the local area through the imaging aperture 125. In some embodiments, the HMD 100 shown in FIG. 1A also includes one or more locators 135. The locators 135 are objects located in specific positions on the HMD 100 relative to one another and relative to the reference point 115. A locator 135 may be a light emitting diode (LED), a corner cube reflector, a reflective marker, a type of light source that contrasts with an environment in which the HMD 100 operates, or some combination thereof.

In one embodiment, the front rigid body 105 includes one or more electronic display elements (not shown in FIG. 1A), one or more integrated eye tracking systems (not shown in FIG. 1A), an Inertial Measurement Unit (IMU) 140, one or more position sensors 145, and the reference point 115. In the embodiment shown by FIG. 1A, the position sensors 145 are located within the IMU 140, and neither the IMU 140 nor the position sensors 145 are visible to a user of the HMD 100. The IMU 140 is an electronic device that generates fast calibration data based on measurement signals received from one or more of the position sensors 145. A position sensor 145 generates one or more measurement signals in response to motion of the HMD 100. Examples of position sensors 145 include: one or more accelerometers, one or more gyroscopes, one or more magnetometers, another suitable type of sensor that detects motion, a type of sensor used for error correction of the IMU 140, or some combination thereof. The position sensors 145 may be located external to the IMU 140, internal to the IMU 140, or some combination thereof.

In some embodiments, the HMD 100 utilizes measurement data obtained from at least one of the DCA, the locators 135, the IMU 140 and the position sensors 145 to determine and track a position and/or orientation of the HMD 100 relative to a specific reference point on the console that wirelessly communicates with the HMD 100. The HMD 100 may include one or more processors (not shown in FIG. 1A) configured to translate the determined and tracked relative position of the HMD 100 into information about a preferred direction for a transmission beam for wireless communication with the console. In one or more embodiments, the antenna array 120 may use the transmission beam with the preferred direction to communicate over a wireless link with the console, wherein a quality of the wireless link is above a predetermined threshold level.

Figure 1B:
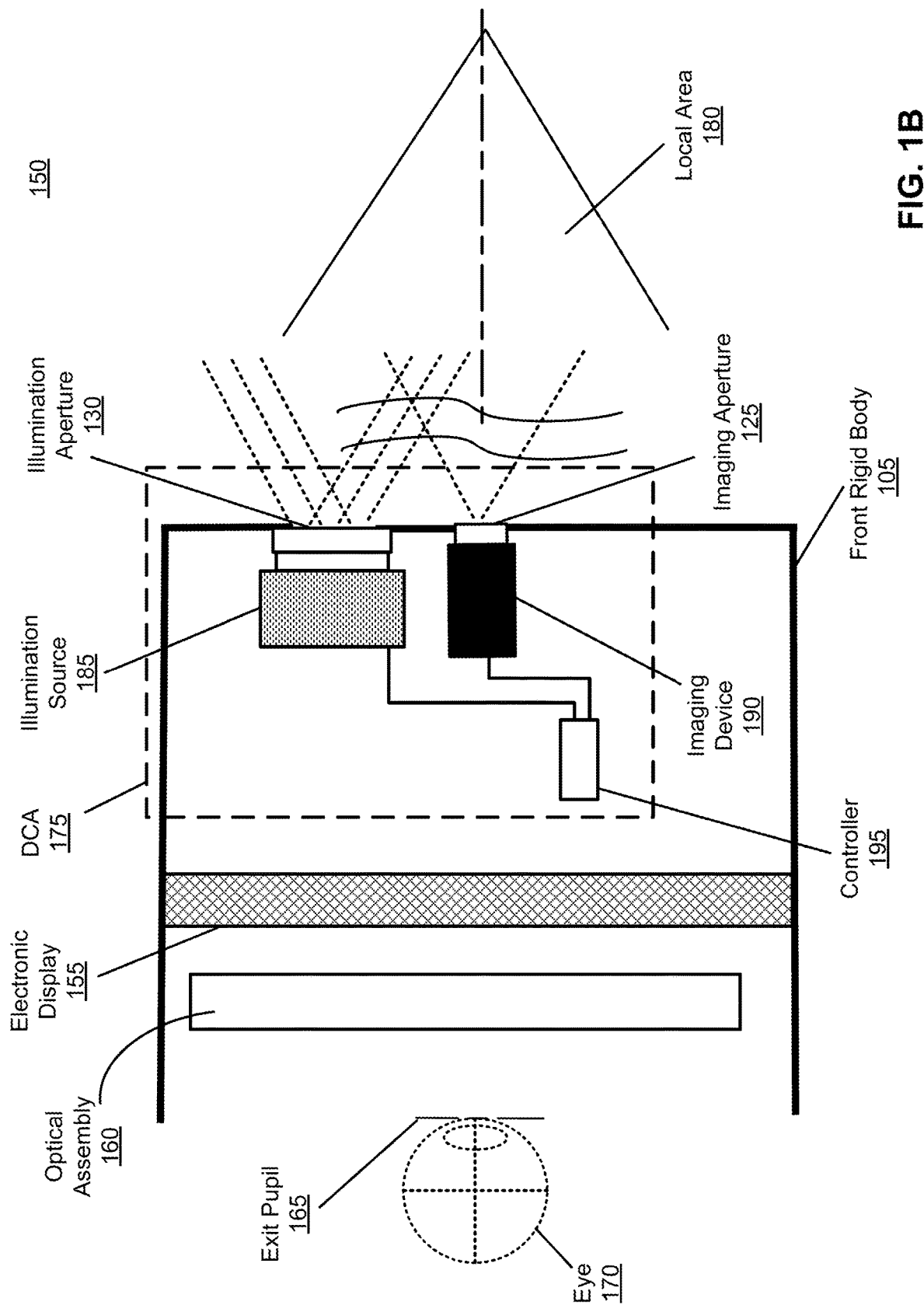
FIG. 1B is a cross section of a front rigid body of the HMD in FIG. 1A, in accordance with an embodiment.

FIG. 1B is an example cross section 150 of the front rigid body 105 of the embodiment of the HMD 100 shown in FIG. 1A. As shown in FIG. 1B, the front rigid body 105 includes an electronic display 155 and an optical assembly 160 that together provide image light to an exit pupil 165. The exit pupil 165 is the location of the front rigid body 105 where a user's eye 170 is positioned. For purposes of illustration, FIG. 1B shows a cross section 150 associated with a single eye 170, but another optical assembly 160, separate from the optical assembly 160, provides altered image light to another eye of the user.

The electronic display 155 generates image light. In some embodiments, the electronic display 155 includes an optical element that adjusts the focus of the generated image light. The electronic display 155 displays images to the user in accordance with data received from a console (not shown in FIG. 1B). In various embodiments, the electronic display 155 may comprise a single electronic display or multiple electronic displays (e.g., a display for each eye of a user). Examples of the electronic display 155 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 155 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 160 magnifies received light from the electronic display 155, corrects optical aberrations associated with the image light, and the corrected image light is presented to a user of the HMD 100. At least one optical element of the optical assembly 160 may be an aperture, a Fresnel lens, a refractive lens, a reflective surface, a diffractive element, a waveguide, a filter, a reflective surface, a polarizing reflective surface, or any other suitable optical element that affects the image light emitted from the electronic display 155. Moreover, the optical assembly 160 may include combinations of different optical elements. In some embodiments, one or more of the optical elements in the optical assembly 160 may have one or more coatings, such as anti-reflective coatings, dichroic coatings, etc. Magnification of the image light by the optical assembly 160 allows elements of the electronic display 155 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly 160 is designed so its effective focal length is larger than the spacing to the electronic display 155, which magnifies the image light projected by the electronic display 155. Additionally, in some embodiments, the amount of magnification may be adjusted by adding or removing optical elements.

In some embodiments, the front rigid body 105 further includes a DCA 175 for determining depth information of one or more objects (e.g., walls, furniture, console, etc.) in a local area 180 surrounding some or all of the HMD 100. The determination of depth information can be also referred to herein as depth mapping or three-dimensional (3D) reconstruction of the local area 180. The DCA 175 may include an illumination source 185, an imaging device (camera) 190, and a controller 195 that may be coupled to both the illumination source 185 and the imaging device 190. The illumination source 185 emits light (e.g., structured light) through the illumination aperture 130. The illumination source 185 may be composed of a plurality of laser-type light emitters on a single substrate configured to simultaneously or in different time instants (e.g., controlled by the controller 195) emit a plurality of light beams, e.g., in the form of a structured light pattern. The imaging device 190 captures light from the illumination source 185 that is reflected/scattered from the local area 180 through the imaging aperture 125. The controller 195 may be configured to determine depth information of the one or more objects in the local area 180 based on the captured reflected/scattered light. In some embodiments, in addition to shapes of the objects, the controller 195 can be configured to determine materials of which the objects are composed, such as metal, glass, wood, carpet, etc.

FIG. 2A illustrates a wireless system 200 that includes a HMD 210 in a first position wirelessly communicating with a console 220, in accordance with an embodiment. The wireless system 200 is a wireless VR system, a wireless AR system, a wireless MR system, or some combination thereof. The HMD 210 is an embodiment of the HMD 100 shown in FIG. 1A. As shown in FIG. 2A, the console 220 uses at least one directional wide beam 225 (i.e., tapering) to alleviate the requirement for beam tracking at the console 220. In an alternate embodiment (not shown in FIG. 2A), the console 220 may use a directional narrow beam when wirelessly communicating with the HMD 210. The HMD 210 uses a directional narrow beam (e.g., a first directional narrow beam 230 shown in FIG. 2A) to maintain link gain when wirelessly communicating with the console 220. Alternatively, the HMD 210 may use a directional wide beam to wirelessly communicate with the console 220.

FIG. 2B illustrates the wireless system 200 where the HMD 210 switches a narrow beam for wireless communication with the console 220 to a preferred direction when the HMD 210 moves from the first position to a second position relative to a specific reference point on the console 220 (not shown in FIG. 2B). The HMD 210 may apply an "inside-out" positional tracking to switch wireless communication with the console 220 from the first directional narrow beam 230 to a second directional narrow beam 235. An "inside-out" positional tracking applied at a HMD relates to continuous tracking of position/orientation of the HMD relative to a console, and to automatic beam switching at the HMD based on a detected change in HMD's position/orientation without any feedback from the console. During the "inside-out" positional tracking, the HMD 210 tracks its position relative to the reference point on the console 220. Because the HMD 210 knows its location relative to the reference point on the console 220, the HMD 210 can determine its movement relative to the console 220. Then, the HMD 210 can automatically redirect a narrow beam to a new direction for communicating with the console 220, i.e., the HMD 210 switches wireless communication with the console 220 from the first directional narrow beam 230 to a second directional narrow beam 235 as shown in FIG. 2B. By switching the directional beams, the HMD 210 ensures that a quality of communication link between the HMD 210 and the console 220 is still above a predetermined threshold value.

FIG. 2C illustrates the wireless system 200 where the HMD 210 switches a narrow beam for wireless communication with the console 220 to a new preferred direction when the HMD 210 moves relative to the console 220 from the second position to a third position, in accordance with an embodiment. As shown in FIG. 2C, when the HMD 210 further moves relative to the specific reference point on the console 220, the HMD 210 is configured to switch wireless communication with the console 220 from the second directional narrow beam 235 to a third directional narrow beam 240, again to ensure that a quality of communication link between the HMD 210 and the console 220 is still above a predetermined threshold value. Note that no feedback is transmitted from the console 220 to the HMD 210 or from the HMD 210 to the console 220 with any information about quality of links associated with different directional beams. Thus, communication bandwidth overhead is reduced by employing the "inside out" positional tracking. In one embodiment, the console 220 emits a beacon signal (e.g., visible beacon) via an antenna mounted on the console 220 (not shown in FIGS. 2A-2C). The HMD 210 receives the beacon signal and tracks its position/orientation relative to the console 220 using the beacon signal. In this setup, the HMD 210 may track its position/orientation relative to the console 220 faster and more accurately in comparison with a setup when no beacon signal is emitted from the console 220.

Figure 3:
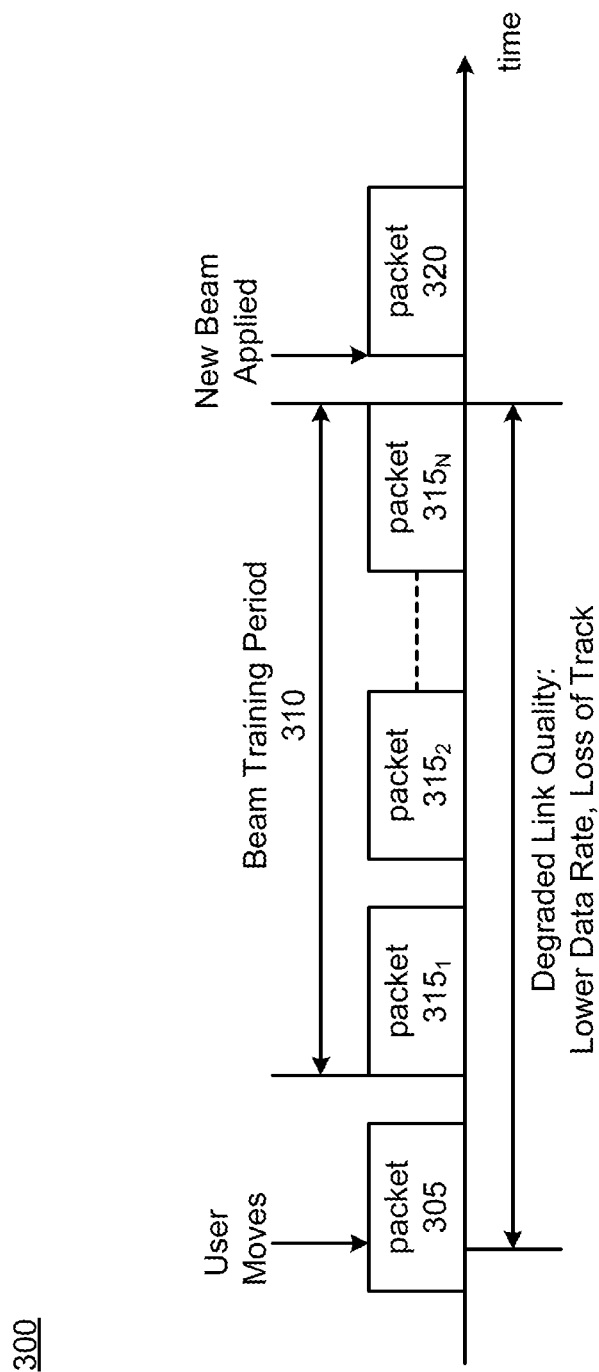
FIG. 3 is an example of beam training applied at the HMD in FIG. 1A used for beam switching when the HMD wirelessly communicates with a console, in accordance with an embodiment.

FIG. 3 is an example 300 of beam training applied at a HMD (e.g., the HMD 100 in FIG. 1A) used for beam switching when the HMD wirelessly communicates with a console, in accordance with an embodiment. Packets of data may be wirelessly communicated between the HMD and the console, e.g., from the HMD to the console. For example, the HMD transmits a data packet 305 to the console using a first directional narrow beam of a plurality of directional narrow beams of the HMD. As shown in FIG. 3, during transmission of the data packet 305, a user of the HMD may move relative to a specific reference point on the console. Before switching a directional narrow beam for communication with the console, the HMD may perform beam training in order to determine a preferred directional narrow beam for wireless communication with the console.

In some embodiments, the HMD performs beam training by employing beam level sweep during a beam training period 310 when the HMD transmits packets $315_1$, $315_2$, ..., $315_N$ to the console using various directional narrow beams. The console receives the packets $315_1$, $315_2$, ..., $315_N$ transmitted using different directional narrow beams and sends a feedback to the HMD indicating to the HMD a preferred directional narrow beam that provides a best link quality among the different directional narrow beams. The beam training period 310 will last a certain period of time, during which the communication performance may drop, e.g., due to the usage of an outdated directional beam for communications between the HMD and the console.

At the end of the beam training period 310, the beam training is completed and the HMD is able to determine a new preferred directional narrow beam for communication with the console, which ensures that a quality of communication link between the HMD and the console is finally above a predetermined threshold value. At this point, after the entire beam period 310, the HMD switches packet transmission from the first directional narrow beam to the new preferred directional narrow beam, and the HMD transmits the data packet 320 using the new preferred directional narrow beam. In addition to the degraded link quality during the beam training period 310, a latency of switching directional narrow beams at the HMD may be prohibitively long and depends on duration of the beam training period 310, which may be up to between 100 ms and 200 ms. The latency of beam switching based on beam training often cannot support quick movements of the user wearing the HMD.

Figure 4:
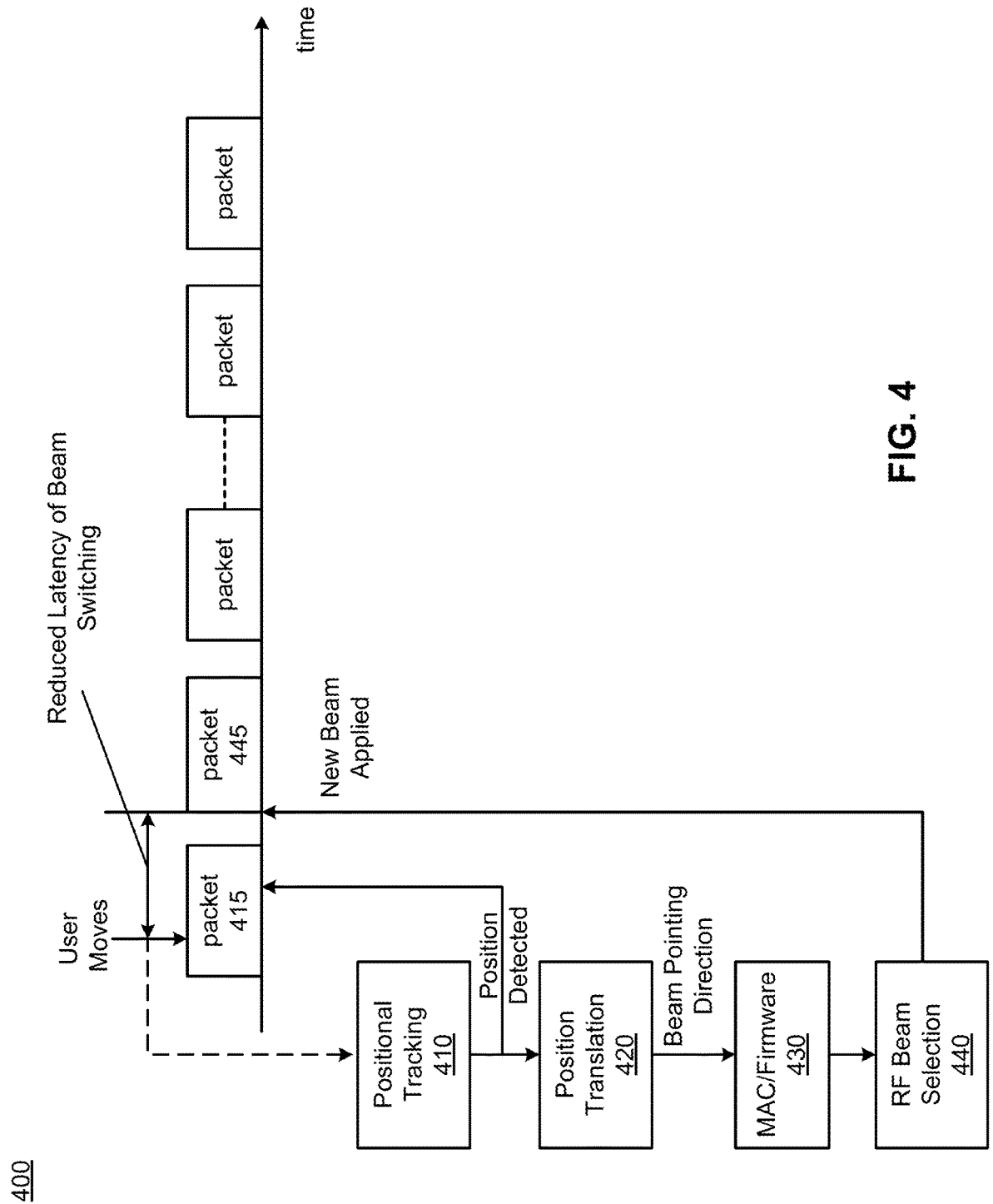
FIG. 4 is an example of an inside-out positional tracking applied at the HMD in FIG. 1A for beam switching when the HMD wirelessly communicates with a console, in accordance with an embodiment.

FIG. 4 is an example 400 of an "inside-out" positional tracking applied at a HMD (e.g., the HMD 100 in FIG. 1A, the HMD 210 in FIGS. 2A-2C), which may be used for beam switching when the HMD wirelessly communicates with a console (e.g., the console 220 in FIGS. 2A-2C), in accordance with an embodiment. A positional tracking system of the HMD applies an "inside-out" positional tracking 410 to track a position/orientation of the HMD relative to a specific reference point on the console. In some embodiments, the positional tracking system may comprise one or more processors coupled to at least one of the DCA, one or more locators, an IMU, and one or more position sensors of the HMD for determining and tracking location of the HMD relative to the reference point on the console. As the HMD moves (e.g., movement caused by a user of the HMD) during transmission of a packet 415, the HMD applies the positional tracking 410 to detect a change in position/orientation of the HMD relative to the console. The positional tracking system of the HMD tracks over time positions/orientations of the HMD and periodically updates information about its position/orientation relative to the console. Based on the tracked positions/orientations of the HMD over a defined time period, the HMD detects the change in its position/orientation relative to the console. As a new position of the HMD is detected, a conversion unit of a beam controller in the HMD may perform a position translation 420 to translate positional information determined by the positional tracking 410 into a beam pointing direction that corresponds to one specific directional narrow beam of the HMD. The positional information of the HMD may comprise various informations related to position/orientation of the HMD relative to the reference point on the console. For example, the positional information may comprise information about an angular position of the HMD relative to the reference point on the console, information about a rotational position of the HMD relative to the reference point, information about a 3D coordinate position of the HMD (e.g., 3D coordinate position of a reference point on the HMD) relative to the reference point on the console, etc. As the HMD knows its position/orientation relative to the reference point on the console, the conversion unit of the beam controller of the HMD may select one directional narrow beam of a plurality of directional narrow beams of the HMD, wherein the selected directional narrow beam covers a preferred region in space comprising the reference point. In an embodiment, the HMD may perform the positional tracking 410 and the position translation 420 during transmission of the packet 415.

In some embodiments, information about the beam pointing direction (the selected preferred directional narrow beam) is passed directly to a modem of the HMD, i.e., to a media access control (MAC) layer/firmware block 430, which may be also part of the beam controller in the HMD. The HMD's modem (i.e., the MAC layer/firmware block 430) is configured to switch a directional narrow beam of the HMD to a narrow beam with a proper direction when a user of the HMD moved relative to the reference point on the console. A radio frequency (RF) beam selection block 440 is coupled to a transceiver of the HMD, and the RF beam selection block 440 is configured to perform switching to a new preferred directional narrow beam. The RF beam selection block 440 instructs the transceiver of the HMD to send data to the console using the new preferred directional narrow beam instead of previously used directional narrow beam. Thus, the transceiver of the HMD may transmit a packet 445 that immediately follows the packet 415 using the new preferred directional narrow beam. Note that the latency of beam switching based on the "inside-out" positional tracking is reduced by duration of the beam training period 310 in FIG. 3 in comparison with the beam switching based on the beam training.

In some embodiments, as the user of the HMD moves and LOS still exists between the HMD and the console, the HMD is configured to switch wireless communication with the console to a newly determined directional narrow beam such that to maintain LOS without delay. If it is previously determined that non-line-of-sight (NLOS) condition is established between the HMD and the console as the HMD knows its positional information relative to the console, the HMD is configured to switch to a preferred reflection path directly without delay. In an embodiment, the HMD may perform a background RF beam training with very small overhead. In alternate embodiments, if the console can afford to perform extra beam tracking by itself, the console can use a relatively narrow directional beam for wireless communication with the HMD, instead of a wide directional beam, e.g., the wide directional beam 225 shown in FIGS. 2A-2C.

In addition to a short latency of beam switching, the "inside-out" positional tracking illustrated in FIG. 4 features no additional communication bandwidth overhead, as no feedback is transmitted from the console 220 to the HMD 210 or vice versa as in the case of beam switching based on the beam training shown in FIG. 3. Furthermore, the "inside-out" positional tracking is accurate as the HMD has knowledge of its position/orientation relative to the console. The "inside-out" positional tracking also avoids side-lobe issues when the HMD communicates with the console via a narrow directional beam. When applying the "inside-out" positional tracking, the HMD identifies NLOS immediately without any error. In some embodiments, a latency involved in the "inside-out" positional tracking procedure illustrated in FIG. 4 that includes the positional tracking 410, the position translation 420, beam switching using the MAC layer/firmware 430 and the RF beam selection block 440 may be up to several milliseconds, which may be suitable for typical movements of the HMD's user.

Figure 5A:
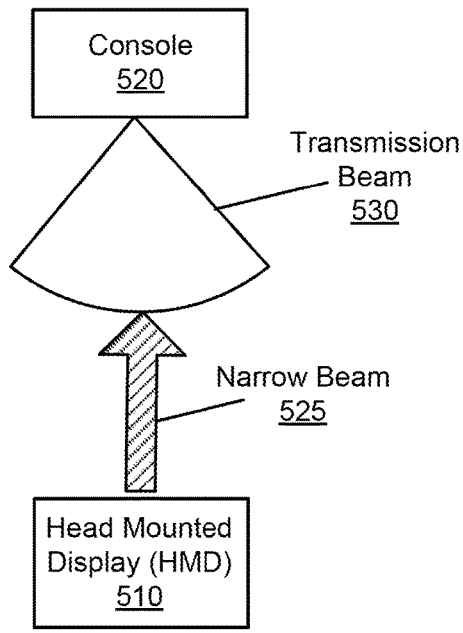
FIG. 5A is a wireless system that includes the HMD in FIG. 1A wirelessly communicating with a console, in accordance with an embodiment.

FIG. 5A illustrates a wireless system 500 that includes a HMD 510 wirelessly communicating with a console 520, in accordance with an embodiment. The wireless system 500 is a wireless VR system, a wireless AR system, a wireless MR system, or some combination thereof. The HMD 510 is an embodiment of the HMD 100 shown in FIG. 1A. In some embodiments, the console 520 uses an "outside-in" positional tracking for beam switching. An "outside-in" positional tracking relates to continuous determination and tracking of position/orientation of a HMD relative to a reference point on the console, sending feedback information to the HMD about a change in position/orientation of the HMD, and to automatic beam switching performed at the HMD based on the feedback information received from the console. In addition, based on the positional information about the HMD determined at the console, the console may switch its directional beam to another directional beam for wireless communication with the HMD.

In the setup shown in FIG. 5A, the console 520 may comprise a camera, one or more locators, an IMU and/or one or more positional sensors (not shown in FIG. 5A) for determining and tracking the position/orientation of the HMD 510 relative to the reference point on the console 520. In an alternate configuration, the console 520 may utilize measurements from a DCA, one or more locators, an IMU and/or one or more positional sensors of the HMD 510 (not shown in FIG. 5A) for determining and tracking the position/orientation of the HMD 510 relative to the reference point on the console 520. Based on the determined and tracked position/orientation of the HMD 510, the console 520 may control a directional beam at the console 520 for wireless communication with the HMD 510. In order to control a directional narrow beam at the HMD 510, the console 520 may transmit a feedback signal with information about the determined and tracked position/orientation of the HMD 510 relative to the reference point on the console 520. Based on the received feedback signal, the HMD 510 may switch a directional narrow beam for wireless transmission to the console 520. As shown in FIG. 5A, the HMD 510 performs wireless communication with the console 520 using a directional narrow beam 525, and the console 520 performs wireless communication with the HMD 510 using a transmission beam 530 that can be either a directional wide transmission beam or a directional narrow transmission beam. In an alternate embodiment (not shown in FIG. 5A), the HMD 510 performs wireless communication with the console 520 using a directional wide beam.

Figure 5B:
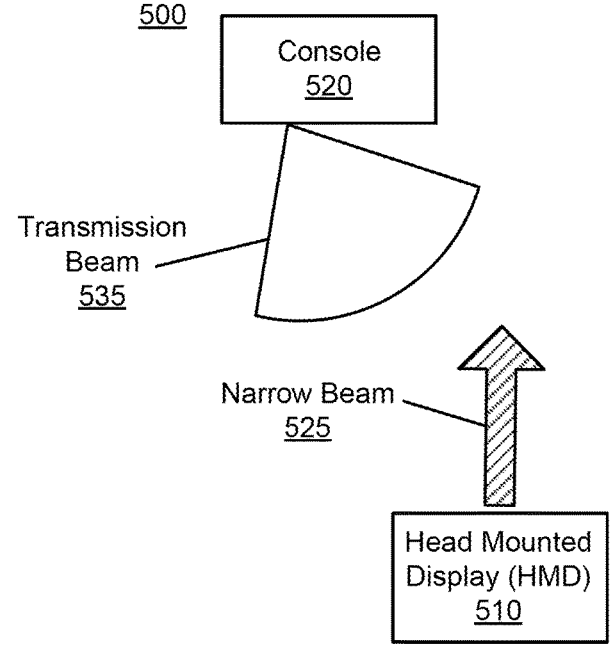
FIG. 5B is the wireless system shown in FIG. 5A where the console uses an outside-in positional tracking to switch its directional beam for wireless communication with the HMD when the HMD moves relative to the console, in accordance with an embodiment.

FIG. 5B is the wireless system 500 where the console 520 applies the "outside-in" positional tracking to switch a beam for wireless communication with the HMD 510 to a preferred direction when the HMD 510 moves relative to the console 520, in accordance with an embodiment. In the illustrative embodiment shown in FIG. 5B, as the user of the HMD 510 moves to the right relative to the console 520, the "outside-in" positional tracking applied at the console 520 may initiate switching wireless communication with the HMD 510 from the transmission beam 530 to a transmission beam 535 to ensure a quality of communication link between the HMD 510 and the console 520 is above a predetermined threshold value. Information about the new transmission beam 535 can be fed back from the console 520 to the HMD 510 to further fine tune a directional beam at the HMD 510.

Figure 5C:
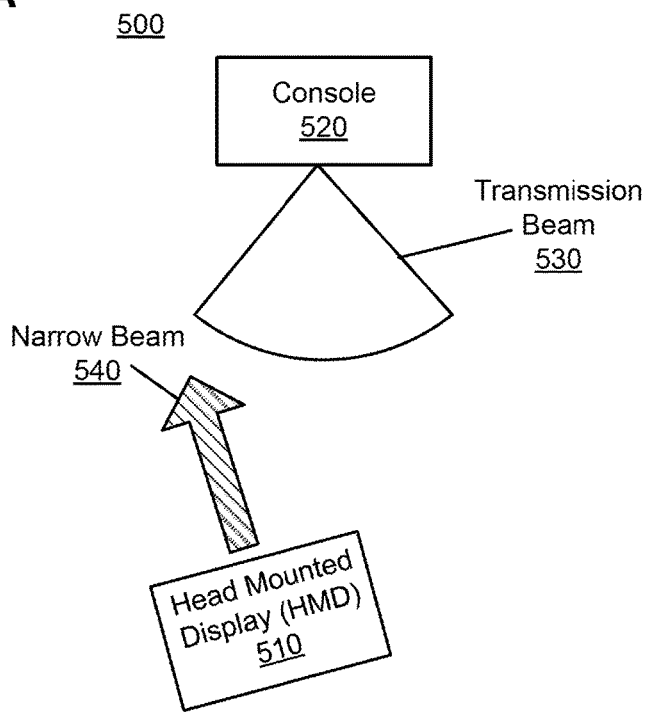
FIG. 5C is the wireless system shown in FIG. 5A where the console maintains a directional beam for wireless communication with the HMD although the HMD changed position relative to the console, in accordance with an embodiment.

FIG. 5C is the wireless system 500 where the console 520 maintains a directional beam for wireless communication with the HMD 510 although the HMD 510 changed its position relative to the console 520, in accordance with an embodiment. In the illustrative embodiment shown in FIG. 5C, as the user of the HMD 510 rotates to the left relative to the console 520, a preferred transmission beam at the console 520 (e.g., the transmission beam 530) may not change. However, the preferred transmission beam 530 may not be good enough to ensure that a quality of communication link between the HMD 510 and the console 520 is above a predetermined threshold value. Thus, information about a new position of the HMD 510 obtained based on the "outside-in" positional tracking applied at the console 520 needs to be fed back from the console 520 to the HMD 510 for initiating beam switching at the HMD 510 from a directional narrow beam 540 to some other directional narrow beam.

In some embodiments, the feedback communicated from the console 520 to the HMD 510 may increase a latency of beam switching at the HMD 510 in comparison with the "inside-out" positional tracking discussed in conjunction with FIGS. 2A-2C and FIG. 4. However, the latency of the "outside-in" positional tracking applied at the console 520 may still support typical movements of the user of the HMD 510. In an illustrative embodiment, a total latency of beam switching applied at the HMD 510 based on the "outside-in" positional tracking performed at the console 520 is a sum of several latencies. A first latency represents a time period for the console 520 to perform tracking of position/orientation of the HMD 510 relative to the console 520, which may take approximately 2 ms due to a constellation updating rate of 500 Hz. Following the first latency, a second latency represents a software/hardware (SW/HW) time period required for a modem of the console 520 to switch beams at the console 520. The SW time period of the console 520 corresponds to a time for the SW of the console 520 to finish conversion of positional information to a new directional beam; the HW time period of the console 520 represents an actual HW switch time and settling time. After that, the positional information of the HMD 510 is fed back from the console 520 to the HMD 510 to direct the HMD 510 to switch beam for achieving improved communication performance. The feedback process and HMD switch beam operation takes additional HW/SW time period of the HMD 510, which corresponds to a third latency. Thus, the total latency of beam switching based on the "outside-in" positional tracking is equal to the sum of the first latency (e.g., 2 ms), the second latency (e.g., SW/HW time period of the console 520) and the third latency (e.g., HW/SW time period of the HMD 510). In some embodiments, the latency of beam switching based on the "outside-in" positional tracking may still be lower than a latency of sector level sweep which may be up to 100 ms. In terms of latency, the "outside-in" positional tracking may be less efficient than the beam refinement protocol. However, the "outside-in" positional tracking may have more reliable accuracy than the beam refinement protocol.

Figure 6:
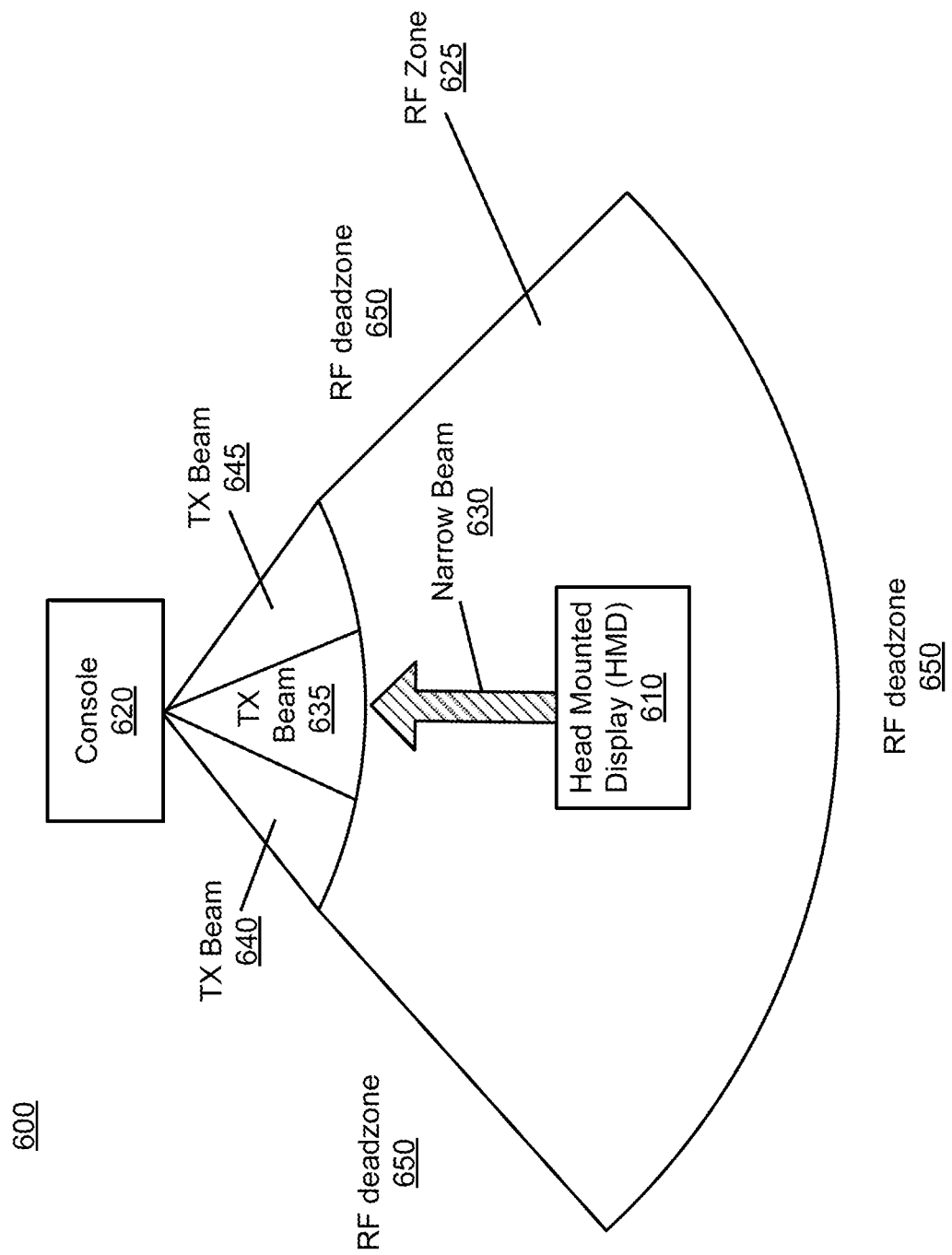
FIG. 6 is a wireless system that includes the HMD in FIG. 1A wirelessly communicating with a console, wherein the console sets up a radio frequency (RF) zone where a quality of wireless communication between the HMD and the console is above a threshold level, in accordance with an embodiment.

FIG. 6 is a wireless system that includes a HMD 610 wirelessly communicating with a console 620, wherein the console 620 sets up (determines) a radio frequency (RF) zone 625 where a quality of wireless communication between the HMD 610 and the console 620 is above a predetermined threshold level, in accordance with an embodiment. A quality of wireless link between the HMD 610 and the console 620 outside of the RF zone 625 is below the threshold value, i.e., the HMD 610 cannot reliable operate outside the RF zone 625. The wireless system 600 is a wireless VR system, a wireless AR system, a wireless MR system, or some combination thereof, which can improve RF performance of both the HMD 610 and the console 620. The HMD 610 is an embodiment of the HMD 100 shown in FIG. 1A.

In an illustrative embodiment shown in FIG. 6, the HMD 610 performs wireless communication with the console 620 using a narrow directional beam 630, while the console 620 performs wireless communication with the HMD 610 using a transmission beam 635 within the RF zone 625. In an alternate embodiment (not shown in FIG. 6), the HMD 610 may wirelessly communicate with the console 620 using a directional wide beam. In an embodiment, the transmission beam 635 of the console 620 is a narrow directional beam. In an alternate embodiment, the transmission beam 635 is a wide directional beam. In some embodiments, the console 620 applies the "outside-in" positional tracking to determine and track position/orientation of the HMD 610 relative to a specific reference point on the console 620. The console 620 may utilize the determined position/orientation of the HMD 610 to switch a transmission beam of the console 620, e.g., from the transmission beam 635 to a transmission beam 640 or to a transmission beam 645 as a user of the HMD 610 moves within the RF zone 625. The console 620 may further transmit a feedback to the HMD 610 with information about the determined position/orientation of the HMD 610 relative to the reference point on the console 620. The HMD 610 may utilize the received information about the determined position/orientation of the HMD 610 relative to the reference point on the console 620 to switch a transmission beam at the HMD 610 as the user of the HMD 610 moves within the RF zone 625.

In some embodiments, the console 620 transmits a warning message to the HMD 610 indicating that the HMD 610 is approaching an RF deadzone 650 outsize the RF zone 625 where a quality of wireless coverage from the console 620 is below a predetermined threshold value. In some embodiments, information about the coverage RF zone 625 which is known at the console 620 may facilitate transmit beam selection at the console 620, without an overhead and independently of beam selection at the HMD 610. In contrast, in the IEEE 802.11ad standard, in order to train transmit beam and select a preferred directional beam for wireless transmission, feedback is needed about a quality of link associated with that directional beam. In some embodiments, since the HMD 610 typically moves relatively slow in comparison with a time needed for transmission of a packet between the console 620 and the HMD 610, the console 620 can send a feedback to the HMD 610 with information about the RF zone 625, so that the HMD 610 can focus a beam tracking only in the RF zone 625 instead of performing a complete beam training. This approach saves significant overhead in the sector level sweep and the beam refinement protocol procedures.

In some embodiments, a console that wirelessly communicates with a HMD comprises a module configured for motion prediction. The motion prediction module of the console can predict a "future" position of the HMD relative to a specific reference point on the console, which can facilitate finding a correct directional beam at the console pointing to the "future" position of the HMD. Similarly to the "outside-in" positional tracking, the motion prediction applied at the console can only control a directional beam at the console. In order to control a directional beam at the HMD, the console may need to transit a feedback to the HMD with information about the predicted "future" position of the HMD. The motion prediction module included in the console can be configured to predict a position/orientation of the HMD for a certain limited time period in the future, e.g., a time period of 20 ms in the future. In one or more embodiments, the motion prediction applied at the console can help reduce the number of directional beams that needs to be tracked at the console, which reduces beam switching latency at the console. In alternate embodiments, motion prediction can be also implemented at the HMD, which can facilitate faster beam switching at the HMD based on a predicted "future" position of the HMD.

In some embodiments, a HMD that wirelessly communicates with a console includes a DCA, e.g., the DCA 175 shown in FIG. 1B. The DCA may be configured to determine depth information of one or more objects in a local area surrounding some or all of the HMD. In one or more embodiments, the HMD fuses the determined depth information with positional information relative to the console (e.g., determined by applying the "inside-out" positional tracking) to fine tune a directional beam at the HMD for wireless communication with the console. In one embodiment, the HMD utilizes the depth information to check whether a directional beam for communication with the console obtained based on the "inside-out" positional tracking is accurate. In alternate embodiments, the HMD uses the determined depth information to obtain information about RF deadzone, information about NLOS zone, information about LOS blockage, etc. The HMD may use the depth information to determine whether a user wearing the HMD is approaching a capability limit of the RF system after which a lower performance/throughput is expected. In yet another embodiment, the determined depth information comprises 3D information about objects in the local area as well as information about materials of the objects. In this case, the HMD may utilize the determined depth information to directly calculate beam forming coefficients without using the conventional beam forming algorithm. The beam forming coefficients calculated in this way may be more accurate than beam forming coefficients obtained based on the conventional beam forming algorithm. In addition, the depth information may be combined with a machine learning process to train the HMD to obtain and predict a beam forming metric.

In some embodiments, a console that wirelessly communicates with a HMD includes a DCA having the same functionality as the DCA 175 of the HMD 100 shown in FIG. 1B. The DCA of the console may be thus configured to determine depth information of one or more objects in a local area surrounding some or all of the console. In addition to HMD's positional information (e.g., determined based on the "outside-in" positional tracking), the console may provide the determined depth information to the HMD for fine tuning of a directional beam of the HMD for wireless communication with the console.

Disclosed embodiments support a wireless VR, a wireless AR or a wireless MR system having a console that wirelessly communicates with a HMD. The joint cross-layer beam forming methods can be applied that involve RF/PHY/MAC subsystems and the positional tracking subsystems at the console and/or the HMD. Directional wide beam(s) can be utilized at the console to alleviate beam tracking difficulty. Instead of using standard and traditional mm-wave 60 GHz RF/base-band centric beam tracking, the "inside-out" positional tracking can be implemented at the HMD to assist achieving multi-fold benefits. Other positional tracking methods can be also applied, such as the "outside-in" positional tracking applied at the console, at the cost of additional feedback communicated from the console to the HMD and the associated longer latency for beam switching.

Figure 7:
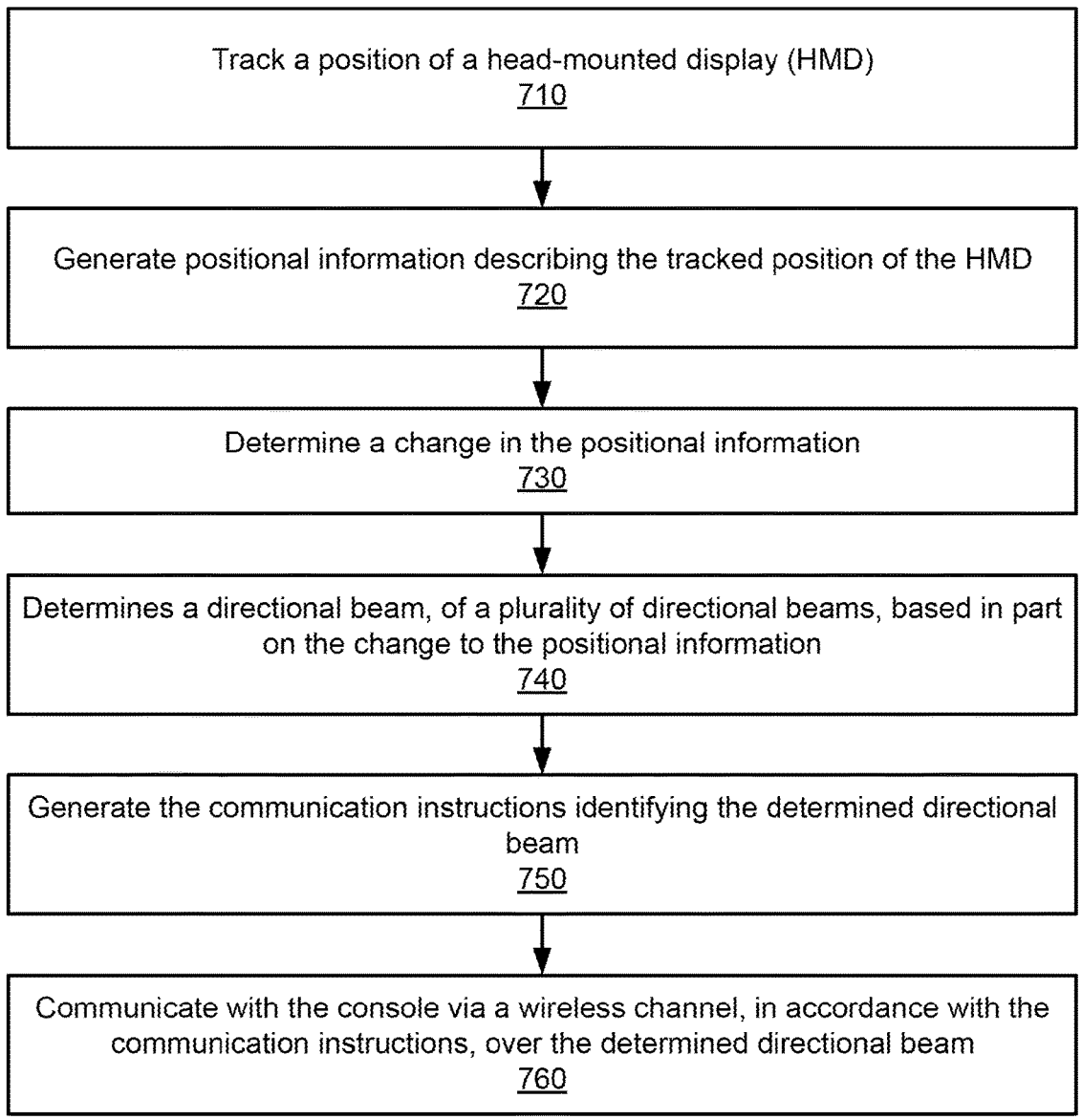
FIG. 7 is a flow chart illustrating a process of positional tracking assisted beam forming, which may be implemented at the HMD shown in FIG. 1A, in accordance with an embodiment.

FIG. 7 is a flow chart illustrating a process 700 of positional tracking assisted beam forming, which may be implemented at the HMD shown in FIG. 1A, in accordance with an embodiment. The process 700 of FIG. 7 may be performed by the components of a HMD (e.g., the HMD 100). Other entities may perform some or all of the steps of the process in other embodiments. Likewise, embodiments may include different and/or additional steps, or perform the steps in different orders.

The HMD tracks 710 (e.g., via a positional tracking system) a position of the HMD. In some embodiments, the HMD tracks the position of the HMD relative to a reference point on a console that wirelessly communicating with the HMD. In some embodiments, the HMD utilizes measurement data obtained from at least one of a DCA, one or more locators, an IMU and one or more position sensors of the HMD to determine and track the position of the HMD relative to the reference point on the console.

The HMD generates 720 (e.g., via the positional tracking system) positional information describing the tracked position of the HMD. For example, the positional information may comprise information about an angular position of the HMD relative to the reference point on the console, information about a rotational position of the HMD relative to the reference point, information about a 3D coordinate position of the HMD relative to the reference point, etc. In some embodiments, the HMD generates 720 the positional information by periodically updating information about the HMD's position relative to the reference point on the console.

The HMD determines 730 (e.g., via a beam controller) a change in the positional information. In some embodiments, the HMD determines 730 that the change in the positional information is greater than a threshold value, which requires switching to a new directional beam of the HMD for wireless communication with the console. In some embodiments, based on the tracked positions/orientations of the HMD over a defined time period, the HMD determines 730 the change in the HMD's position relative to the console. The HMD determines 730 the change in the positional information based on, e.g., comparison between two positions/orientations that the HMD occupies relative to the console in two consecutive time instants when the positional information is measured.

The HMD determines 740 (e.g., via the beam controller) a directional beam, of a plurality of directional beams, based in part on the change to the positional information. In some embodiments, the directional beams are directional narrow beams. In alternate embodiments, the directional beams are directional wide beams. In some embodiments, the HMD determines 740 the directional beam based on information about a previously used directional beam and information about the change to position/orientation of the HMD relative to a position/orientation of the HMD occupied when the previous directional beam was used. As the HMD knows its position relative to the reference point on the console, the HMD selects one directional beam of the plurality of directional beams of the HMD such that the selected directional beam covers a preferred region in space that comprises the reference point of the console.

The HMD generates 750 (e.g., via the beam controller) the communication instructions identifying the determined beam direction. In some embodiments, the HMD generates 750 the communication instructions that indicate switching wireless communication with the console to the selected directional beam.

The HMD communicates 760 (e.g., via a transceiver) with the console via a wireless channel, in accordance with the communication instructions, over the determined directional beam. In some embodiments, the HMD switches wireless communication with the console to the newly selected directional beam.

Figure 8:
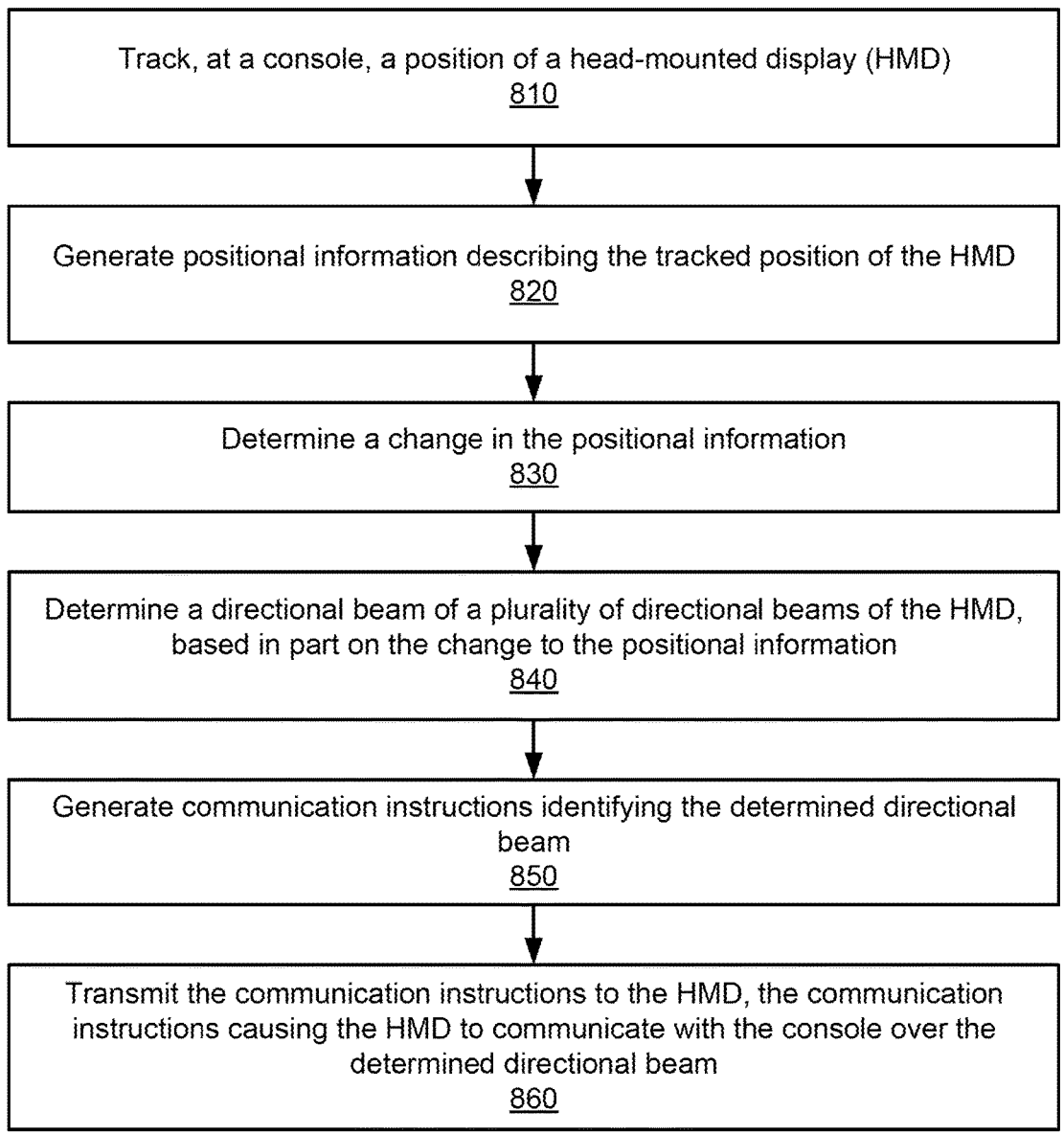
FIG. 8 is a flow chart illustrating a process of positional tracking assisted beam forming, which may be implemented at a console wirelessly communicating with the HMD shown in FIG. 1A, in accordance with an embodiment.

FIG. 8 is a flow chart illustrating a process 800 of positional tracking assisted beam forming, which may be implemented at a console wirelessly communicating with the HMD shown in FIG. 1A, in accordance with an embodiment. The process 800 of FIG. 8 may be performed by the components of a console (e.g., the console 520 in FIGS. 5A-5C and/or the console 620 in FIG. 6). Other entities may perform some or all of the steps of the process in other embodiments. Likewise, embodiments may include different and/or additional steps, or perform the steps in different orders.

The console tracks 810 (e.g., via a positional tracking system) a position of a HMD. In some embodiments, the console tracks the position of the HMD relative to a reference point on the console. In some embodiments, the console utilizes measurement data obtained from at least one of a camera, locators, IMU and/or positional sensors for determining and tracking the position of the HMD relative to the reference point on the console.

The console generates 820 (e.g., via the positional tracking system) positional information describing the tracked position of the HMD. For example, the positional information may comprise information about an angular position of the HMD relative to the reference point on the console, information about a rotational position of the HMD relative to the reference point, information about a 3D coordinate position of the HMD relative to the reference point, etc. In some embodiments, the console generates 820 the positional information by periodically updating information about the HMD's position relative to the reference point on the console.

The console determines 830 (e.g., via a beam controller) a change in the positional information. In some embodiments, the console determines 830 that the change in the positional information of the HMD is greater than a threshold value, which requires switching to a new directional beam of the HMD for wireless communication with the console. In some embodiments, based on the tracked positions/orientations of the HMD over a defined time period, the console determines 830 the change in the HMD's position relative to the console. The console determines 830 the change in the positional information of the HMD based on, e.g., comparison between two positions/orientations that the HMD occupies relative to the console in two consecutive time instants when the positional information is measured at the console.

The console determines 840 (e.g., via the beam controller) a directional beam of a plurality of directional beams of the HMD, based in part on the change to the positional information. In some embodiments, the directional beams of the HMD are directional narrow beams. In alternate embodiments, the directional beams of the HMD are directional wide beams. In some embodiments, the console determines 840 the directional beam based on information about a previously used directional beam at the HMD and information about the change to position/orientation of the HMD relative to a position/orientation of the HMD occupied when the previous directional beam was used. As the console knows the HMD's position relative to the reference point on the console, the console selects one directional beam of the plurality of directional beams of the HMD such that the selected directional beam covers a preferred region in space that comprises the reference point of the console.

The console generates 850 (e.g., via the beam controller) communication instructions identifying the determined directional beam. In some embodiments, the console generates 850 the communication instructions that indicate switching to the selected directional beam of the HMD for wireless communication with the console.

The console transmits 860 (e.g., via a transceiver) the communication instructions to the HMD, the communication instructions causing the HMD to communicate with the console over the determined directional beam. In some embodiments, the HMD receives the communication instructions and switches wireless communication with the console to the newly selected directional beam.

System Environment

Figure 9:
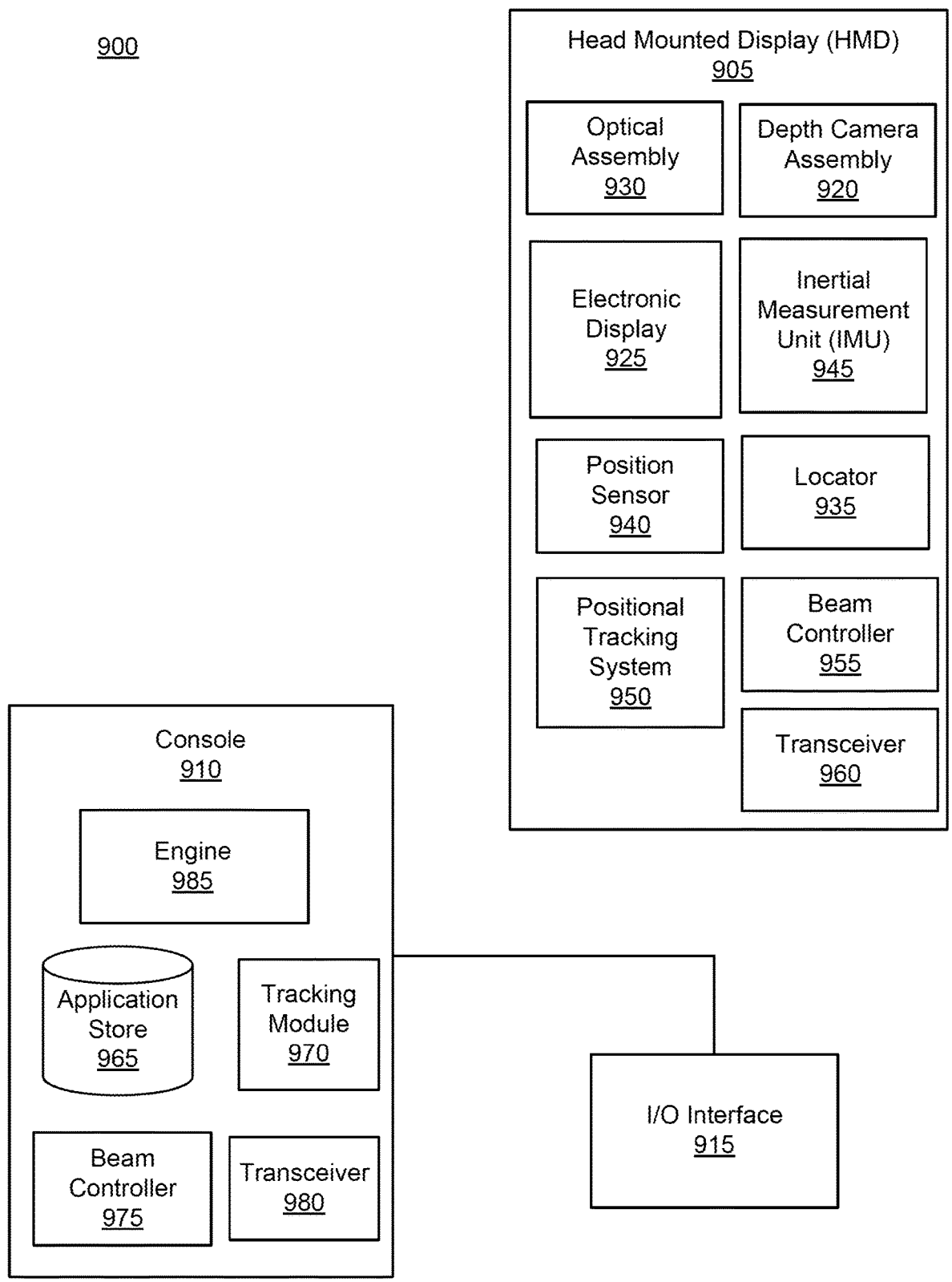
FIG. 9 is a block diagram of a system environment that includes the HMD shown in FIG. 1A wirelessly communicating with a console, in accordance with an embodiment.

FIG. 9 is a block diagram of one embodiment of a HMD system 900 in which a console 910 operates. The HMD system 900 may operate in a VR system environment, an AR system environment, a MR system environment, or some combination thereof. The HMD system 900 shown by FIG. 9 comprises a HMD 905 and an input/output (I/O) interface 915 that is coupled to the console 910. While FIG. 9 shows an example HMD system 900 including one HMD 905 and on I/O interface 915, in other embodiments any number of these components may be included in the HMD system 900. For example, there may be multiple HMDs 905 each having an associated I/O interface 915, with each HMD 905 and I/O interface 915 communicating with the console 910. In alternative configurations, different and/or additional components may be included in the HMD system 900. Additionally, functionality described in conjunction with one or more of the components shown in FIG. 9 may be distributed among the components in a different manner than described in conjunction with FIG. 9 in some embodiments. For example, some or all of the functionality of the console 910 is provided by the HMD 905.

The HMD 905 is a head-mounted display that presents content to a user comprising virtual and/or augmented views of a physical, real-world environment with computer-generated elements (e.g., two-dimensional (2D) or 3D images, 2D or 3D video, sound, etc.). In some embodiments, the presented content includes audio that is presented via an external device (e.g., speakers and/or headphones) that receives audio information from the HMD 905, the console 910, or both, and presents audio data based on the audio information. The HMD 905 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 905 is the HMD 100 described above in conjunction with FIG. 1A.

The HMD 905 includes a DCA 920, an electronic display 925, an optical assembly 930, one or more locators 935, one or more position sensors 940, an IMU 945, a positional tracking system 950, a beam controller 955, and a transceiver 960. Some embodiments of the HMD 905 have different components than those described in conjunction with FIG. 9. Additionally, the functionality provided by various components described in conjunction with FIG. 9 may be differently distributed among the components of the HMD 905 in other embodiments.

The DCA 920 captures data describing depth information of an area surrounding the HMD 905. The data describing depth information may be associated with one or a combination of the following techniques used to determine depth information: structured light, time of flight, or some combination thereof. The DCA 920 can compute the depth information using the data, or the DCA 920 can send this information to another device such as the console 910 that can determine the depth information using data from the DCA 920.

The DCA 920 includes an illumination source, an imaging device, and a controller. The illumination source emits light onto an area surrounding the HMD 905. The illumination source includes a plurality of emitters on a single substrate. The imaging device captures ambient light and light from one or more emitters of the plurality of emitters of the plurality of emitters that is reflected from objects in the area. The controller coordinates how the illumination source emits light and how the imaging device captures light. In some embodiments, the controller may also determine depth information associated with the local area using the captured images.

The illumination source of the DCA 920 includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source can emit light having a structured light pattern.

The DCA 920 may be an embodiment of the DCA 175 in FIG. 1B. The DCA 920 may determine depth information of one or more objects in a local area surrounding some or all of the HMD 905. In one embodiment, the HMD 905 may fuse the depth information determined by the DCA 920 with positional information relative to the console (e.g., determined by applying the "inside-out" positional tracking) to fine tune a directional beam at the HMD 905 for wireless communication with the console 910. In another embodiment, the HMD 905 uses the depth information determined by the DCA 920 to obtain information about RF deadzone, information about NLOS zone, information about LOS blockage, etc. In yet another embodiment, the HMD 905 uses the depth information determined by the DCA 920 to directly calculate beam forming coefficients without using the conventional beam forming algorithm.

The electronic display 925 displays 2D or 3D images to the user in accordance with data received from the console 910. In various embodiments, the electronic display 925 comprises a single electronic display or multiple electronic displays (e.g., a display for each eye of a user). Examples of the electronic display 925 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 925 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display 925.

The optical assembly 930 magnifies image light received from the electronic display 925, corrects optical errors associated with the image light, and presents the corrected image light to a user of the HMD 905. The optical assembly 930 includes a plurality of optical elements. Example optical elements included in the optical assembly 930 include: an aperture, a Fresnel lens, a refractive lens, a reflective surface, a diffractive element, a waveguide, a filter, a reflective surface, a polarizing reflective surface, or any other suitable optical element that affects image light. Moreover, the optical assembly 930 may include combinations of different optical elements. In some embodiments, one or more of the optical elements in the optical assembly 930 may have one or more coatings, such as partially reflective or anti-reflective coatings, dichroic coatings, etc.

Magnification and focusing of the image light by the optical assembly 930 allows the electronic display 925 to be physically smaller, weigh less and consume less power than larger displays. Additionally, magnification may increase the field of view of the content presented by the electronic display 925. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 930 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 925 for display is pre-distorted, and the optical assembly 930 corrects the distortion when it receives image light from the electronic display 925 generated based on the content.

The locators 935 are objects located in specific positions on the HMD 905 relative to one another and relative to a specific reference point on the HMD 905. A locator 935 may be a light emitting diode (LED), a corner cube reflector, a reflective marker, a type of light source that contrasts with an environment in which the HMD 905 operates, or some combination thereof. In embodiments where the locators 935 are active (i.e., an LED or other type of light emitting device), the locators 935 may emit light in the visible band (~380 nm to 750 nm), in the infrared (IR) band (~750 nm to 1,800 nm), in the ultraviolet band (~100 nm to 380 nm), some other portion of the electromagnetic spectrum, or some combination thereof.

In some embodiments, the locators 935 are located beneath an outer surface of the HMD 905, which is transparent to the wavelengths of light emitted or reflected by the locators 935 or is thin enough to not substantially attenuate the wavelengths of light emitted or reflected by the locators 935. Additionally, in some embodiments, the outer surface or other portions of the HMD 905 are opaque in the visible band of wavelengths of light. Thus, the locators 935 may emit light in the IR band under an outer surface that is transparent in the IR band but opaque in the visible band.

The IMU 945 is an electronic device that generates data indicating a position of the HMD 905 based on measurement signals received from one or more of the position sensors 940 and from depth information received from the DCA 920. A position sensor 940 generates one or more measurement signals in response to motion of the HMD 905. Examples of position sensors 940 include: one or more accelerometers, one or more gyroscopes, one or more magnetometers, another suitable type of sensor that detects motion, a type of sensor used for error correction of the IMU 945, or some combination thereof. The position sensors 940 may be located external to the IMU 945, internal to the IMU 945, or some combination thereof.

Based on the one or more measurement signals from one or more position sensors 940, the IMU 945 generates data indicating an estimated current position of the HMD 905 relative to an initial position of the HMD 905. For example, the position sensors 940 include multiple accelerometers to measure translational motion (forward/back, up/down, left/right) and multiple gyroscopes to measure rotational motion (e.g., pitch, yaw, roll). In some embodiments, the IMU 945 rapidly samples the measurement signals and calculates the estimated current position of the HMD 905 from the sampled data. For example, the IMU 945 integrates the measurement signals received from the accelerometers over time to estimate a velocity vector and integrates the velocity vector over time to determine an estimated current position of a reference point on the HMD 905. Alternatively, the IMU 945 provides the sampled measurement signals to the console 910, which interprets the data to reduce error. The reference point is a point that may be used to describe the position of the HMD 905. The reference point may generally be defined as a point in space or a position related to the HMD's 905 orientation and position.

The IMU 945 receives one or more parameters from the console 910. The one or more parameters are used to maintain tracking of the HMD 905. Based on a received parameter, the IMU 945 may adjust one or more IMU parameters (e.g., sample rate). In some embodiments, certain parameters cause the IMU 945 to update an initial position of the reference point so it corresponds to a next position of the reference point. Updating the initial position of the reference point as the next calibrated position of the reference point helps reduce accumulated error associated with the current position estimated the IMU 945. The accumulated error, also referred to as drift error, causes the estimated position of the reference point to "drift" away from the actual position of the reference point over time. In some embodiments of the HMD 905, the IMU 945 may be a dedicated hardware component. In other embodiments, the IMU 945 may be a software component implemented in one or more processors.

The positional tracking system 950 uses measurement data obtained from at least one of the DCA 920, the one or more locators 935, the one or more position sensors 940, and the IMU 945 to determine and track position of the HMD 905 relative to a specific reference point on the console 910, i.e., to perform the "inside-out" positional tracking of the HMD 905. The positional tracking system 950 further generates positional information describing the tracked position of the HMD 905. The positional tracking system 950 may generate the positional information by periodically updating information about the position of the HMD 905 relative to the reference point on the console 910.

The beam controller 955 determines a change in the positional information determined by the positional tracking system 950. The beam controller 955 may obtain from the positional tracking system 950 information about positions/orientations of the HMD 905 tracked over a defined time period. Based on the tracked positions/orientations of the HMD 905, the beam controller 955 determines the change in the position of the HMD 905 relative to the console 910. The beam controller 955 determines a directional beam, of a plurality of directional narrow beams of the HMD 905, based in part on the change to the positional information. As the HMD 905 knows its position relative to the reference point on the console 910, the beam controller 955 selects one directional narrow beam of the plurality of directional narrow beams of the HMD 905 such that the selected directional narrow beam covers a preferred region in space that comprises the reference point of the console 910. The beam controller 955 further generates the communication instructions identifying the determined directional beam. The beam controller 955 generates the communication instructions that indicate to the transceiver 960 to switch wireless communication with the console 910 to the selected directional narrow beam.

The HMD 905 wirelessly communicates, via the transceiver 960, with the console 910, in accordance with the communication instructions received from the beam controller 955, over the determined directional beam. Based on the communication instructions obtained from the beam controller 955, the transceiver 960 switches wireless communication with the console 910 to the newly selected directional narrow beam. The transceiver 960 is further configured to receive a feedback signal from the console 910, the feedback signal comprising information about a region where a quality of wireless communication between the HMD 905 and the console 910 is above a threshold. The beam controller 955 may be configured to perform beam tracking based on the information about the region obtained from the transceiver 960.

The I/O interface 915 is a device that allows a user to send action requests and receive responses from the console 910. An action request is a request to perform a particular action. For example, an action request may be an instruction to start or end capture of image or video data or an instruction to perform a particular action within an application. The I/O interface 915 may include one or more input devices. Example input devices include: a keyboard, a mouse, a game controller, or any other suitable device for receiving action requests and communicating the action requests to the console 910. An action request received by the I/O interface 915 is communicated to the console 910, which performs an action corresponding to the action request. In some embodiments, the I/O interface 915 includes an IMU 945 that captures calibration data indicating an estimated position of the I/O interface 915 relative to an initial position of the I/O interface 915. In some embodiments, the I/O interface 915 may provide haptic feedback to the user in accordance with instructions received from the console 910. For example, haptic feedback is provided when an action request is received, or the console 910 communicates instructions to the I/O interface 915 causing the I/O interface 915 to generate haptic feedback when the console 910 performs an action.

The console 910 provides content to the HMD 905 for processing in accordance with information received from one or more of: the DCA 920, the HMD 905, and the I/O interface 915. The console 910 communicates wirelessly with the HMD 905. In the example shown in FIG. 9, the console 910 includes an application store 965, a tracking module 970, a beam controller 975, a transceiver 980, and an engine 985. Some embodiments of the console 910 have different modules or components than those described in conjunction with FIG. 9. Similarly, the functions further described below may be distributed among components of the console 910 in a different manner than described in conjunction with FIG. 9.

The application store 965 stores one or more applications for execution by the console 910. An application is a group of instructions, that when executed by a processor, generates content for presentation to the user. Content generated by an application may be in response to inputs received from the user via movement of the HMD 905 or the I/O interface 915. Examples of applications include: gaming applications, conferencing applications, video playback applications, or other suitable applications.

The tracking module 970 calibrates the HMD system 900 using one or more calibration parameters and may adjust one or more calibration parameters to reduce error in determination of the position of the HMD 905 or of the I/O interface 915. For example, the tracking module 970 communicates a calibration parameter to the DCA 920 to adjust the focus of the DCA 920 to more accurately determine positions of structured light elements captured by the DCA 920. Calibration performed by the tracking module 970 also accounts for information received from the IMU 945 in the HMD 905 and/or an IMU 945 included in the I/O interface 915. Additionally, if tracking of the HMD 905 is lost (e.g., the DCA 920 loses line of sight of at least a threshold number of structured light elements), the tracking module 970 may re-calibrate some or all of the HMD system 900.

The tracking module 970 tracks movements of the HMD 905 or of the I/O interface 915 using information from the DCA 920, the one or more locators 935, the one or more position sensors 940, the IMU 945 or some combination thereof. For example, the tracking module 970 determines a position of a reference point of the HMD 905 in a mapping of a local area based on information from the HMD 905. The tracking module 970 may also determine positions of the reference point of the HMD 905 or a reference point of the I/O interface 915 using data indicating a position of the HMD 905 from the IMU 945 or using data indicating a position of the I/O interface 915 from an IMU 945 included in the I/O interface 915, respectively. Additionally, in some embodiments, the tracking module 970 may use portions of data indicating a position or the HMD 905 from the IMU 945 as well as representations of the local area from the DCA 920 to predict a future location of the HMD 905. The tracking module 970 provides the estimated or predicted future position of the HMD 905 or the I/O interface 915 to the engine 985. The estimated position of the HMD 905 and/or the predicted future position of the HMD 905 can be transmitted over a wireless communication link to the HMD 905.

The tracking module 970 tracks a position of the HMD 905, e.g., relative to a reference point on the console 910. The tracking module 970 may utilize measurement data obtained from various positional sensors of the console 910 (not shown in FIG. 9) for determining and tracking the position of the HMD 905 relative to the reference point on the console 910. The tracking module 970 may generate positional information describing the tracked position of the HMD 905. In some embodiments, the tracking module 970 generates the positional information by periodically updating information about the HMD's position relative to the reference point on the console 910.

The beam controller 975 determines a change in the positional information obtained from the tracking module 970. Based on the tracked positions/orientations of the HMD 905 over a defined time period, the beam controller 975 may determine the change in the HMD's position relative to the console 910. The beam controller 975 determines a directional beam of a plurality of directional narrow beams of the HMD 905, based in part on the change to the positional information. As the console 910 knows the HMD's position relative to the reference point on the console 910, the beam controller 975 selects one directional narrow beam of the plurality of directional narrow beams of the HMD 905 such that the selected directional narrow beam covers a preferred region in space that comprises the reference point of the console 910. The beam controller 975 further generates communication instructions identifying the determined directional beam. The beam controller 975 generates the communication instructions that indicate switching at the HMD 905 to the selected directional narrow beam of the HMD 905 for wireless communication with the console 910. The beam controller 975 of the console 910 determines the change in the positional information of the HMD 905, determines the directional beam of the HMD 905, and generates instructions for beam switching in lieu of the HMD 905 performing these functions. Based on the change in the positional information, the beam controller 975 is also configured to adjust an orientation of a wide beam of the console 910 in cases where the wide beam is not, e.g., an omnidirectional pattern. The beam controller 975 may be further configured to perform transmit beam selection associated with the HMD 905, based on information about a region where a quality of communication between the console 910 and the HMD 905 is above a threshold.

The console 910 wirelessly transmits, via the transceiver 980, the communication instructions to the HMD 905. The communication instructions received at the HMD 905 cause the HMD 905 to communicate with the console 910 over the determined directional beam. As the HMD 905 receives the communication instructions from the console 910, the transceiver 960 of the HMD 905 is configured to switch wireless communication with the console 910 to the newly selected directional narrow beam. The transceiver 980 transmits content to the HMD 905 using a directional beam, e.g. a directional narrow beam or a directional wide beam. The transceiver 980 can be also configured to transmit to the HMD 905 an indication that the HMD 905 approaches a zone where a quality of wireless communication between the console 910 and the HMD 905 is below a threshold, based on the positional information of the HMD 905 determined at the console 910. The transceiver 980 is further configured to transmit a feedback signal to the HMD 905, the feedback signal comprising information about a region where a quality of wireless communication between the console 910 and the HMD 905 is above a threshold.

The engine 985 generates a 3D mapping of the area surrounding the HMD 905 (i.e., the "local area") based on information received from the HMD 905. In some embodiments, the engine 985 determines depth information for the 3D mapping of the local area based on information received from the DCA 920 that is relevant for techniques used in computing depth. The engine 985 may calculate depth information using one or more techniques in computing depth (e.g., structured light, time of flight, or some combination thereof). In various embodiments, the engine 985 uses different types of information determined by the DCA 920 or a combination of types of information determined by the DCA 920.

The engine 985 also executes applications within the HMD system 900 and receives position information, acceleration information, velocity information, predicted future positions, or some combination thereof, of the HMD 905 from the tracking module 970. Based on the received information, the engine 985 determines content to provide to the HMD 905 for presentation to the user. For example, if the received information indicates that the user has looked to the left, the engine 985 generates content for the HMD 905 that mirrors the user's movement in a virtual environment or in an environment augmenting the local area with additional content. Additionally, the engine 985 performs an action within an application executing on the console 910 in response to an action request received from the I/O interface 915 and provides feedback to the user that the action was performed. The provided feedback may be visual or audible feedback via the HMD 905 or haptic feedback via the I/O interface 915.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
    a transceiver configured to communicate directly with a console via a wireless channel, in accordance with a communication instruction, the communication instruction causing the transceiver to communicate a first packet with the console over a first directional beam of a plurality of directional beams; and
    a controller configured to:
        obtain information about a change in a position of the HMD relative to the console,
        determine a second directional beam of the plurality of directional beams based in part on the change in the position, and
        provide an updated communication instruction identifying the second directional beam to the transceiver, wherein
    the transceiver is further configured to switch, based on the updated communication instruction, from the first directional beam to the second directional beam for communication with the console of a second packet following the first packet, a latency of the beam switching being less than a time period between the change in the position of the HMD and a start of the second packet.

2. The HMD of claim 1, further comprising a positional tracking system configured to:
    track the position of the HMD relative to the console; and
    generate positional information describing the tracked position of the HMD relative to the console, wherein
    the controller is further configured to obtain the information about the change in the position based on the positional information.

3. The HMD of claim 2, wherein the controller is further configured to:
    translate the positional information and the change in the position into a narrow beam of the HMD corresponding to the second directional beam by selecting the second directional beam from the plurality of directional beams covering a region in space comprising a reference point of the console.

4. The HMD of claim 1, wherein:
    the transceiver is further configured to receive a feedback signal from the console; and
    the controller is further configured to determine the change in the position based on the feedback signal.

5. The HMD of claim 1, wherein the controller is further configured to:
    maintain line-of-sight (LOS) with the console when switching wireless communication with the console to the second directional beam in accordance with the updated communication instruction.

6. The HMD of claim 1, wherein the controller is further configured to:
  establish that a non-line-of-sight (NLOS) condition for wireless communication exists between the HMD and the console; and
  instruct the transceiver to switch wireless communication with the console to some other directional beam, of the plurality of directional beams, the other directional beam comprising a reflection path between the HMD and the console, based on the established NLOS condition for wireless communication.

7. The HMD of claim 1, wherein:
  the transceiver is further configured to receive a feedback signal from the console, the feedback signal comprising information about a region where a quality of wireless communication between the HMD and the console is above a threshold; and
  the controller is configured to determine the second directional beam based on the feedback signal.

8. The HMD of claim 1, wherein the controller is further configured to:
  predict motion of the HMD; and
  instruct the transceiver to switch wireless communication with the console from the second directional beam to some other directional beam of the plurality of directional beams based on the predicted motion of the HMD.

9. The HMD of claim 1, wherein:
  the transceiver is further configured to receive, from the console, information about predicted motion of the HMD; and
  the controller is further configured to:
    determine some other directional beam, of the plurality of directional beams, based in part on the predicted motion of the HMD, and
    instruct the transceiver to switch wireless communication with the console from the second directional beam to the other directional beam.

10. A method performed by a head-mounted display (HMD), the method comprising:
  communicating directly with a console via a wireless channel, in accordance with a communication instruction, to communicate a first packet over a first directional beam of a plurality of directional beams;
  obtaining information about a change in a position of the HMD relative to the console;
  determining a second directional beam of the plurality of directional beams based in part on the change in the position;
  updating the communication instruction identifying the second directional beam; and
  switching, based on the updated communication instruction, from the first directional beam to the second directional beam for communication with the console of a second packet following the first packet, a latency of the beam switching being less than a time period between the change in the position of the HMD and a start of the second packet.

11. The method of claim 10, further comprising:
  tracking the position of the HMD relative to the console;
  generating positional information describing the tracked position of the HMD relative to the console; and
  obtaining the information about the change in the position based on the positional information.

12. The method of claim 11, further comprising:
  translating the positional information and the change in the position into a narrow beam of the HMD corresponding to the second directional beam by selecting the second directional beam from the plurality of directional beams covering a region in space comprising a reference point of the console.

13. The method of claim 10, further comprising:
  receiving a feedback signal from the console; and
  determining the change in the position based on the feedback signal.

14. The method of claim 10, further comprising:
  maintaining line-of-sight (LOS) with the console when switching wireless communication with the console to the second directional beam in accordance with the updated communication instruction.

15. The method of claim 10, further comprising:
  receiving a feedback signal from the console, the feedback signal comprising information about a region where a quality of wireless communication between the HMD and the console is above a threshold; and
  determining the second directional beam based on the feedback signal.

16. The method of claim 10, further comprising:
  predicting motion of the HMD; and
  switching wireless communication with the console from the second directional beam to some other directional beam of the plurality of directional beams based on the predicted motion of the HMD.

17. The method of claim 10, further comprising:
  receiving, from the console, information about predicted motion of the HMD;
  determining some other directional beam of the plurality of directional beams based in part on the predicted motion of the HMD; and
  switching wireless communication with the console from the second directional beam to the other directional beam.

18. An apparatus for wireless communication, the apparatus comprising:
  a transceiver configured to communicate directly with another apparatus via a wireless channel, in accordance with a communication instruction, the communication instruction causing the transceiver to communicate a first packet with the other apparatus over a first directional beam of a plurality of directional beams; and
  a controller configured to:
    obtain information about a change in a position of the apparatus relative to the other apparatus,
    determine a second directional beam of the plurality of directional beams based in part on the change in the position, and
    provide an updated communication instruction identifying the second directional beam to the transceiver, wherein
  the transceiver is further configured to switch, based on the updated communication instruction, from the first directional beam to the second directional beam for communication with the other apparatus of a second packet following the first packet, a latency of the beam switching being less than a time period between the change in the position of the apparatus and a start of the second packet.

19. The apparatus of claim 18, further comprising a positional tracking system configured to:
  track the position of the apparatus relative to the other apparatus; and generate positional information describing the tracked position of the apparatus relative to the other apparatus, wherein the controller is further configured to obtain the information about the change in the position based on the positional information.

20. The apparatus of claim 18, wherein the controller is further configured to:

predict motion of the apparatus; and switch wireless communication with the other apparatus from the second directional beam to some other directional beam of the plurality of directional beams based on the predicted motion.

* * * * *